US012111509B2

(12) United States Patent
Akamatsu (10) Patent No.: US 12,111,509 B2
(45) Date of Patent: Oct. 8, 2024

(54) BOBBIN FOR WINDING OPTICAL FIBER

(71) Applicant: FUJIKURA LTD., Tokyo (JP)

(72) Inventor: Tsuyoshi Akamatsu, Mie (JP)

(73) Assignee: Fujikura Ltd., Tokyo (JP)

( * ) Notice: Subject to any disclaimer, the term of this patent is extended or adjusted under 35 U.S.C. 154(b) by 215 days.

(21) Appl. No.: 17/786,814

(22) PCT Filed: Dec. 16, 2020

(86) PCT No.: PCT/JP2020/046892
§ 371 (c)(1),
(2) Date: Jun. 17, 2022

(87) PCT Pub. No.: WO2021/125208
PCT Pub. Date: Jun. 24, 2021

(65) Prior Publication Data
US 2023/0021882 A1    Jan. 26, 2023

(30) Foreign Application Priority Data

Dec. 20, 2019    (JP) ................. 2019-230472

(51) Int. Cl.
*G02B 6/44* (2006.01)
*B65H 75/14* (2006.01)

(52) U.S. Cl.
CPC .......... *G02B 6/4457* (2013.01); *B65H 75/14* (2013.01); *B65H 2701/32* (2013.01)

(58) Field of Classification Search
CPC ... G02B 6/4457; B65H 75/14; B65H 2701/32
See application file for complete search history.

(56) References Cited

U.S. PATENT DOCUMENTS

| 7,257,280 B1 | 8/2007 | Karpati | |
| 7,874,411 B2* | 1/2011 | Roberts | B65H 75/28 |
| | | | 191/12.4 |
| 9,810,870 B2* | 11/2017 | Akamatsu | B65H 65/00 |
| 10,618,769 B2* | 4/2020 | Grillet | G02B 6/4457 |
| 2019/0016556 A1* | 1/2019 | Akamatsu | B65H 75/14 |

FOREIGN PATENT DOCUMENTS

| JP | H04298711 A | 10/1992 |
| JP | H05008505 U | 2/1993 |
| JP | H09096728 A | 4/1997 |
| JP | H09100061 A | 4/1997 |

(Continued)

OTHER PUBLICATIONS

Goto, Yoshihiro, English Translation for JP 2002-179340 A, 10 pages (Year: 2002).*

(Continued)

*Primary Examiner* — Daniel Petkovsek
(74) *Attorney, Agent, or Firm* — Osha Bergman Watanabe & Burton LLP (57) ABSTRACT

A bobbin for winding optical fiber includes: a body around which an optical fiber is wound; a flange that extends in a radial direction from the body; and a seal that is bonded to an axially outer side surface of the flange. The flange has a void penetrating the flange. A part of the seal covers at least a part of the void. At least a part of a portion of the seal is non-adhesive. The portion covers the void.

17 Claims, 7 Drawing Sheets (56) References Cited

FOREIGN PATENT DOCUMENTS

| | | | |
|---|---|---|---|
| JP | 2000-214362 A | 8/2000 | |
| JP | 2002179340 A * | 6/2002 | ............ B65H 75/22 |
| JP | 2003-137588 A | 5/2003 | |
| JP | 2006-096485 A | 4/2006 | |
| JP | 2007-031115 A | 2/2007 | |
| JP | 2007022802 A | 2/2007 | |
| JP | 2010-013271 A | 1/2010 | |
| JP | 2011513153 A | 4/2011 | |
| JP | 2011184083 A | 9/2011 | |
| JP | 2012035896 A | 2/2012 | |
| JP | 2012-220548 A | 11/2012 | |
| JP | 2014081549 A | 5/2014 | |
| JP | 2014-210647 A | 11/2014 | |
| JP | 2015-048177 A | 3/2015 | |
| JP | 2017-186104 A | 10/2017 | |
| JP | 2017-186158 A | 10/2017 | |
| JP | 2019522600 A | 8/2019 | |

OTHER PUBLICATIONS

International Search Report issued in corresponding International Application No. PCT/JP2020/046892 mailed Mar. 9, 2021 (6 pages).
Written Opinion issued in corresponding International Application No. PCT/JP2020/046892 mailed Mar. 9, 2021 (4 pages).

* cited by examiner

BOBBIN FOR WINDING OPTICAL FIBER

TECHNICAL FIELD

The present invention relates to a bobbin for winding optical fiber, and specifically relates to a bobbin for winding optical fiber provided with a void in a flange portion.

BACKGROUND

In general, an optical fiber is wound around a bobbin for winding optical fiber for transportation or the like. The optical fiber may be subjected to various inspections such as transmission loss measurement in a state of being wound around a bobbin from the viewpoint of quality assurance and the like. In such inspections, generally, an optical fiber wound around a bobbin is unwound a predetermined length at each of both end portions, and then the end portion on one side of the unwound optical fiber and the end portion on the other side of the unwound optical fiber are connected to an inspection device. Therefore, in many cases when winding the optical fiber around the bobbin, it is necessary to secure an inspection marginal length portion over a predetermined length from the end portion of the optical fiber for the purpose of using for the inspection described above. As a bobbin for winding optical fiber capable of securing such an inspection marginal length portion, for example, a bobbin described in Patent Literature 1 below is known.

The bobbin described in Patent Literature 1 includes, in addition to the aforementioned body portion and the aforementioned flange portion, an auxiliary body portion around which the optical fiber starts to be wound. Further, the flange portion is provided with a slit penetrating the flange portion. After the optical fiber is wound around the auxiliary body portion, the optical fiber can be passed to the body portion through the slit, and the optical fiber can be wound around the body portion. Therefore, the optical fiber on the winding start end portion side wound around the auxiliary body portion can be the inspection marginal length portion described above.

Note that in order to protect the optical fiber wound around the bobbin at the time of transportation or the like of the optical fiber, for example, a bobbin case described in Patent Literature 2 below may be attached to the bobbin as described above.

[Patent Literature 1] JP 2003-137588 A
[Patent Literature 2] JP 2017-186104 A

Incidentally, in the bobbin described in Patent Literature 1 described above, the void described above is provided in the flange portion. Therefore, foreign matter such as dust may enter the body portion side through the void and adhere to the optical fiber in the vicinity of the slit. In this case, the quality of the optical fiber wound around the bobbin may be affected.

Further, the bobbin case described in Patent Literature 2 described above is attached to the bobbin when a groove provided on an inner peripheral surface engages with the flange portion. In such a configuration, the slit is hardly covered with the bobbin case. Therefore, even when such a bobbin case is attached to the bobbin, dust may enter the body portion side through the slit.

SUMMARY

Therefore, one or more embodiments of the present invention provide a bobbin for winding optical fiber capable of protecting an optical fiber in the vicinity of a void such as a slit penetrating a flange portion.

A bobbin for winding optical fiber according to one or more embodiments of the present invention includes: a body portion around which an optical fiber is wound; a flange portion that extends in a radial direction from the body portion; and a seal member that is bonded to an axially outer side surface of the flange portion, in which the flange portion is provided with a void penetrating the flange portion, and a part of the seal member covers at least a part of the void, and at least a part of a portion of the seal member covering the void is a non-adhesive portion.

In the bobbin for winding optical fiber described above, since at least a part of the void provided in the flange portion is covered with the seal member described above, foreign matter such as dust can be suppressed from entering the body portion side through the void. Therefore, it is possible to suppress adhesion of the foreign matter to a portion of the optical fiber wound around the body portion, in the vicinity of the void.

Incidentally, since the portion of the seal member covering the void is exposed when viewed from the axially inner side, when the exposed portion is adhesive, there is a possibility that the foreign matter such as dust adheres to the exposed portion. However, in the bobbin for winding optical fiber described above, since at least a part of a portion of the seal member covering the void is a non-adhesive portion, it is possible to suppress adhesion of the foreign matter to such an exposed portion.

As described above, with the bobbin for winding optical fiber, the optical fiber in the vicinity of the void such as the slit penetrating the flange portion can be protected.

Further, the void may be entirely covered with the seal member.

By covering the entire void with the seal member in this manner, it is possible to more effectively suppress entry of the foreign matter such as dust into the body portion side through the void.

Further, the entire portion of the seal member covering the void may be the non-adhesive portion.

As described above, when the entire portion of the seal member covering the void is the non-adhesive portion, it is possible to more effectively suppress adhesion of the foreign matter to the seal member.

Further, at least a portion of the seal member covering the void may be ultraviolet non-transmissive.

With such a configuration, it is possible to suppress ultraviolet rays from entering the body portion side through the void, and it is possible to suppress a portion of the optical fiber wound around the body portion, in the vicinity of the void, from being affected by the ultraviolet rays.

Further, the seal member may have an initial adhesive force of 1.5 N/10 mm or more and 10 N/10 mm or less.

When the initial adhesive force of the seal member is 1.5 N/10 mm or more, the seal member is hardly peeled off from the flange portion even when the seal member is rebonded to the flange portion a plurality of times. Further, when the initial adhesive force of the seal member is 10 N/10 mm or less, workability at the time of attaching and detaching the seal member can be improved.

Further, the void may be a slit extending from an outer edge of the flange portion toward the body portion.

With such a configuration, the optical fiber can be easily introduced from the axially outer side toward the axially inner side as compared with the case where the void described above is a through-hole.

Further, when the void described above is a slit, the width of the non-adhesive portion may be larger than the slit width of the slit.

In this way, the slit can be easily covered with the non-adhesive portion as compared with the case where the width of the non-adhesive portion is the same as the slit width of the slit.

Further, when the width of the non-adhesive portion is larger than the slit width of the slit, the width of the non-adhesive portion may be larger than the slit width of the slit in a range of 1 mm or more and 3 mm or less.

In this way, the slit can be more easily covered with the non-adhesive portion, and the non-adhesive portion can be suppressed from becoming unnecessarily large.

Further, the breaking elongation of the seal member may be 100% or more.

With such a configuration, the seal member can be flexibly deformed according to the shape of the portion to which the seal member is bonded, and the adhesion of the seal member can be enhanced.

Further, on the axially outer side surface of the flange portion, at least one rib protruding to an axially outer side from the surface may extend from an outer edge side of the flange portion toward the body portion side, and a part of an outer edge of the seal member may have a shape corresponding to an outer edge on the void side of the rib adjacent to the void.

In this case, the seal member can be bonded such that a part of the aforementioned outer edge of the seal member is along the outer edge on the void side of the aforementioned rib adjacent to the void. Therefore, alignment of the seal member can be easy.

Further, the seal member may include: a base material having a sheet shape; an adhesive material that is provided on a surface of the base material facing the flange portion side; and a bonding member that is bonded to a part of the adhesive material and has a non-adhesive surface on a side opposite to the base material side.

With this configuration, the non-adhesive portion can be formed only by bonding the bonding member to the adhesive material already applied to the base material. Therefore, the seal member having the non-adhesive portion can be easily formed as compared with the case where the non-adhesive portion is formed such that the application range of the adhesive material is adjusted such that the adhesive material is not applied to a part of the base material.

Further, when the seal member includes the bonding member described above, the linear expansion coefficient of the bonding member may be smaller than the linear expansion coefficient of the base material.

In this case, when the base material contracts, the contraction of the base material can be suppressed by the bonding member having a small linear expansion coefficient. Therefore, deformation of the seal member can be suppressed.

Further, when the seal member includes the bonding member described above, the Young's modulus of the bonding member may be larger than the Young's modulus of the base material.

In this case, when the base material is bent, the bending of the base material can be suppressed by the bonding member having a large Young's modulus. Therefore, deformation of the seal member can be suppressed.

Further, when the seal member includes the bonding member described above, the thickness of the bonding member may be 70 μm or more and 120 μm or less.

When the thickness of the bonding member is 70 μm or more, the strength of the bonding member can be increased and deformation of the base material can be suppressed as compared with the case where the aforementioned thickness is smaller than 70 μm. On the other hand, when the thickness of the bonding member is a thinness of 120 μm or less, a step between the base material and the bonding member can be reduced as compared with the case where the thickness of the bonding member is larger than 120 μm. When the step between the base material and the bonding member is small as described above, it is possible to suppress a decrease in the bonding area between the adhesive material and the flange portion due to the step, and it is possible to have favorable adhesiveness between the seal member and the flange portion.

As described above, according to the present invention, a bobbin for winding optical fiber capable of protecting an optical fiber in the vicinity of a void such as a slit penetrating a flange portion can be provided.

DETAILED DESCRIPTION

One or more embodiments for carrying out the bobbin for winding optical fiber according to the present invention will be illustrated below together with the accompanying drawings. The embodiments illustrated below is for facilitating the understanding of the present invention, and are not for limiting the interpretation of the present invention. The present invention can be changed or modified from the embodiments below without departing from the spirit. Further, in the present specification, the dimensions of each member may be exaggerated for ease of understanding.

Figure 1:
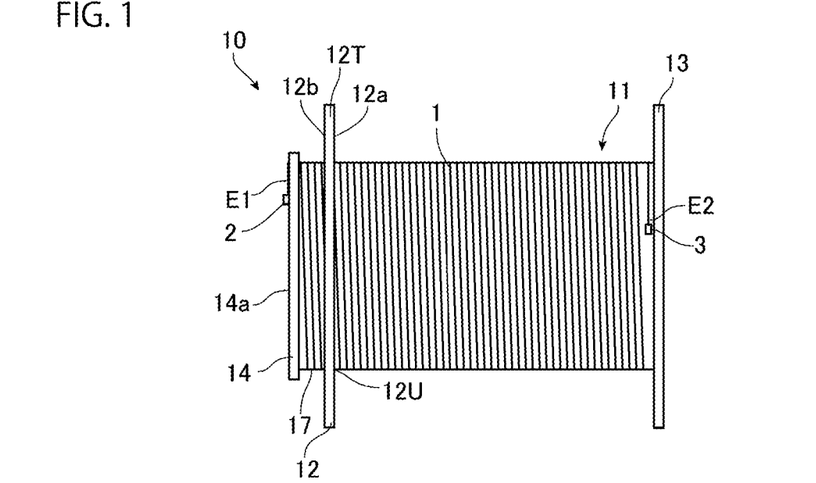
FIG. 1 is a side view illustrating a bobbin for winding optical fiber according to one or more embodiments together with an optical fiber wound around the bobbin.

FIG. 1 is a side view illustrating a bobbin for winding optical fiber 10 according to one or more embodiments together with an optical fiber 1 wound around the bobbin for winding optical fiber 10. Note that the bobbin for winding optical fiber may be hereinafter simply referred to as a bobbin.

As illustrated in FIG. 1, the bobbin 10 includes a body portion 11 (i.e., body) having a cylindrical shape, and a first flange portion 12 (i.e., first flange) and a second flange portion 13 (i.e., second flange) extending in a radial direction from the body portion 11. Note that the radial direction refers to a direction from the central axis of the body portion 11 toward the outer edge of the body portion 11 in a cross section perpendicular to the central axis of the body portion 11. The optical fiber 1 is wound around the body portion 11. The first flange portion 12 and the second flange portion 13 have substantially the same diameter, and the diameter may be approximately 30 cm to 50 cm. Note that although FIG. 1 illustrates a state in which the optical fiber 1 is wound in a single layer around the body portion 11 in order to avoid complication of the drawing, the optical fiber 1 may be wound in multiple layers around the body portion 11.

Here, a direction along the central axis of the body portion 11 is referred to as the axial direction, a center side in the axial direction of the body portion 11 with respect to the first flange portion 12 and the second flange portion 13 is referred to as an axially inner side, and a side opposite to the center side is referred to as an axially outer side. The first flange portion 12 includes a first main surface 12a on the axially inner side and a second main surface 12b on the axially outer side. The first main surface 12a faces the optical fiber 1 wound around the body portion 11.

Figure 2:
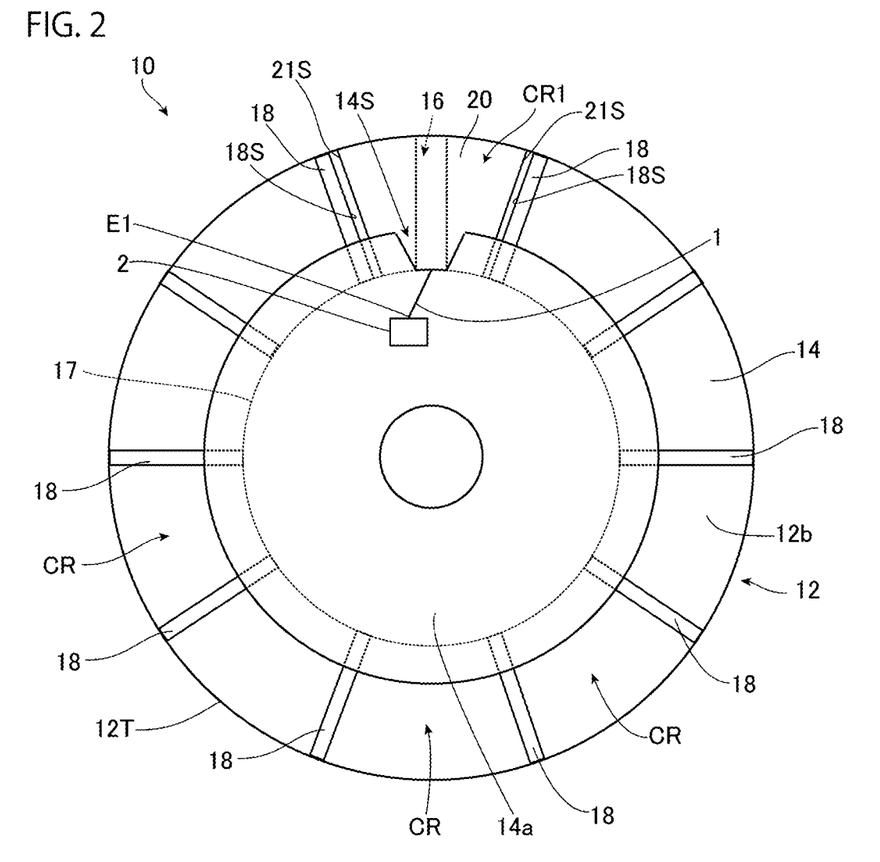
FIG. 2 is a view of the bobbin for winding optical fiber illustrated in FIG. 1 as viewed from an axially outer side and is a view illustrating the bobbin together with the optical fiber wound around the bobbin.

FIG. 2 is a view of the bobbin 10 as viewed from the axially outer side and illustrates a state in which the optical fiber 1 is wound around the bobbin 10.

As illustrated in FIG. 2, on the second main surface 12b of the first flange portion 12, a plurality of ribs 18 protruding to the axially outer side from the second main surface 12b extends from an outer edge 12T side of the first flange portion 12 toward the body portion 11 side. Such ribs 18 reinforce the strength of the first flange portion 12. On the second main surface 12b, a plurality of generally fan-shaped regions CR surrounded by a pair of adjacent ribs 18 among the plurality of ribs 18, a part of the outer edge 12T of the first flange portion 12, and a part of the outer edge of the body portion 11 is formed. Although not illustrated, similar ribs may be provided on the second flange portion 13.

Figure 3:
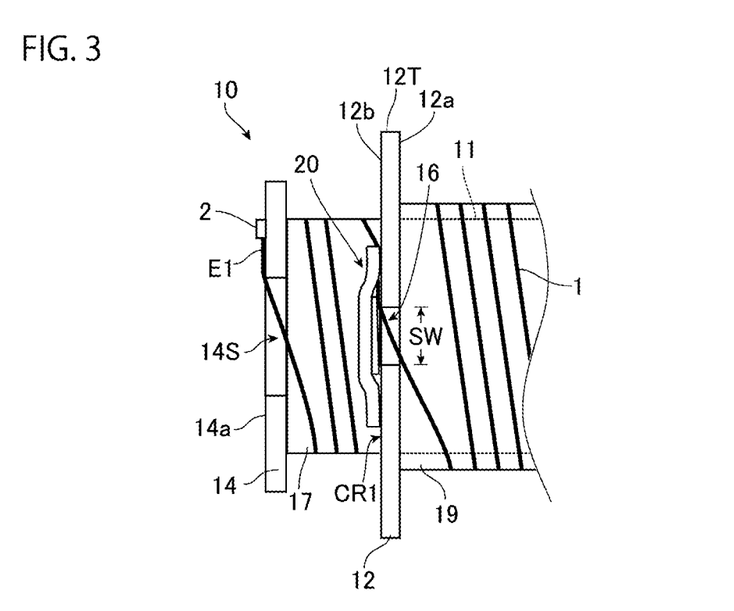
FIG. 3 is a view illustrating the vicinity of a first flange portion of the bobbin for winding optical fiber illustrated in FIG. 1 together with the optical fiber wound around the bobbin and is a view viewed from an outer edge side of the flange portion toward a body portion side.

FIG. 3 is a view illustrating the vicinity of the first flange portion 12 together with the optical fiber 1, and is a view as viewed from the outer edge 12T side of the first flange portion 12 toward the body portion 11 side. Note that FIG. 3 illustrates a state in which the optical fiber 1 is wound in a single layer around the body portion 11 and the illustration of the ribs 18 is omitted in order to avoid complication of the drawing as in FIG. 1.

As illustrated in FIG. 3, the outer peripheral surface of the body portion 11 is covered with a cushioning material 19. Note that, in FIG. 1, the illustration of the cushioning material 19 is omitted.

As illustrated in FIGS. 2 and 3, a void penetrating the first flange portion 12 in the axial direction is formed in the first flange portion 12. In one or more embodiments, the void is a slit 16 extending over the entire width of the first flange portion 12 in the radial direction. The slit 16 is formed substantially in the middle of a region CR1, which is one of the regions CR of the second main surface 12b described above. In this manner, the slit 16 is adjacent to a pair of ribs 18. Further, when the bobbin 10 is viewed from the axially outer side, portions 18S on the slit 16 side of the respective outer edges of the pair of ribs 18 forming the region CR1 extend linearly. A slit width SW of the slit 16 is larger than the diameter of the optical fiber 1, and may be, for example, approximately 8 mm.

A seal member 20 (i.e., seal) is bonded to the region CR1, and in one or more embodiments, the slit 16 is entirely covered with the seal member 20. Note that the seal member 20 will be described in detail below.

As illustrated in FIGS. 1 to 3, the bobbin 10 further includes an auxiliary body portion 17 extending toward the axially outer side from the first flange portion 12, and an auxiliary flange portion 14 extending in the radial direction from the outer peripheral surface of the terminal end portion of the auxiliary body portion 17. In one or more embodiments, the diameter of the auxiliary body portion 17 and the diameter of the body portion 11 are substantially the same, and the length of the auxiliary body portion 17 along the axial direction is shorter than the length of the body portion 11 along the axial direction. The auxiliary flange portion 14 is provided with a slit 14S, and the slit 14S and the slit 16 are arranged on a substantially straight line along the axial direction. In one or more embodiments, the auxiliary body portion 17 and the body portion 11 are integrally formed, and the auxiliary body portion 17 and the body portion 11 are partitioned by the first flange portion 12. However, the auxiliary body portion 17 and the body portion 11 may be separate bodies. As illustrated in FIG. 3, the diameter of the auxiliary flange portion 14 is smaller than the diameter of the first flange portion 12 and the second flange portion 13.

In one or more embodiments, the optical fiber 1 is wound around the bobbin 10 as described below. First, in a state where an end portion E1 on one side of the optical fiber 1 is fixed to an outer surface 14a of the auxiliary flange portion 14 by a fixing seal 2, the optical fiber 1 is introduced into the auxiliary body portion 17 through the slit 14S of the auxiliary flange portion 14 and wound several turns around the outer peripheral surface of the auxiliary body portion 17. Then, the optical fiber 1 is introduced into the body portion 11 through the slit 16. Here, a portion of the optical fiber 1 on the auxiliary body portion 17 side, in the vicinity of the slit 16, is fixed to the second main surface 12b of the first flange portion 12 by the seal member 20 described above. The optical fiber 1 introduced to the body portion 11 side is wound around the outer peripheral surface of the cushioning material 19 in a one-layer or multiple layers from the vicinity of the first flange portion 12 to the vicinity of the second flange portion 13. Then, an end portion E2 on the other side of the optical fiber 1 is fixed to the cushioning material 19 by a fixing seal 3 in the vicinity of the second flange portion 13.

Incidentally, a section of the optical fiber 1 wound around the auxiliary body portion 17 can be easily unwound by peeling off the fixing seal 2 bonded to the auxiliary flange portion 14. Further, for example, as illustrated in FIG. 1, when the optical fiber 1 is wound such that the end portion E2 on the side opposite to the end portion E1 is exposed, the end portion E2 can be easily unwound by peeling off the fixing seal 3. Then, by connecting the end portion E1 unwound from the auxiliary body portion 17 and the end portion E2 unwound from the vicinity of the second flange portion 13 to a predetermined inspection device, transmission loss or the like of the optical fiber 1 wound around the bobbin 10 can be measured.

Figure 4:
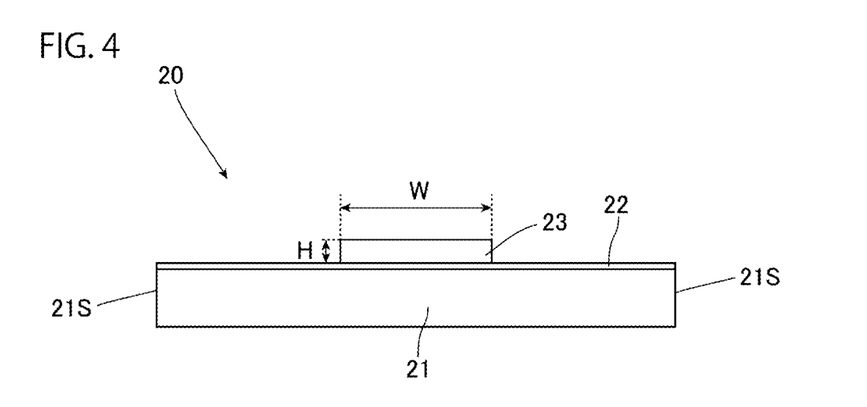
FIG. 4 is a side view of a seal member illustrated in FIG. 2.

Next, the above-described seal member 20 will be described. FIG. 4 is a side view illustrating the seal member 20. As illustrated in FIG. 4, the seal member 20 mainly includes a base material 21, an adhesive material 22, and a bonding member 23.

The base material 21 is a sheet-like member, and is a non-adhesive member in one or more embodiments. The base material 21 includes a pair of main surfaces facing each other in a thickness direction and a pair of side surfaces 21S facing each other in a width direction perpendicular to the thickness direction. The base material 21 has a smaller dimension than the region CR1 described above in the reference state before expansion and contraction.

Figure 5:
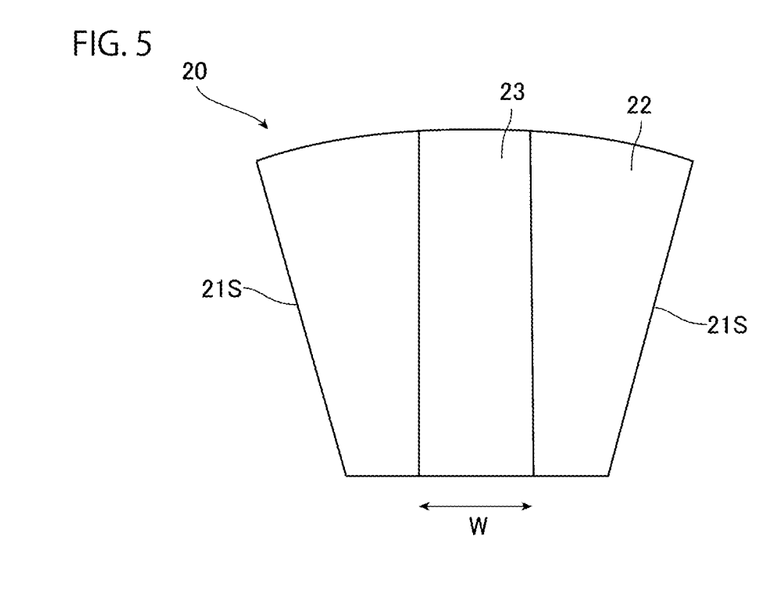
FIG. 5 is a plan view of the seal member illustrated in FIG. 4.

FIG. 5 is a plan view of the seal member 20 as viewed from the bonding member 23 side, and the outer shape of the base material 21 is a substantially fan shape. Further, in a plan view of the seal member 20, the pair of side surfaces 21S described above can be visually recognized as outer edges of the seal member 20, and can be visually recognized in linear shapes inclined in opposite directions.

Further, the base material 21 has predetermined elasticity. As described above, the base material 21 has predetermined elasticity, and elasticity is imparted to the seal member 20. That is, the seal member 20 can be deformed according to the shape of the portion to which the seal member 20 is bonded, and in one or more embodiments, can be deformed so as to cover substantially entirely the region CR1 described above.

The material of the base material 21 is not particularly limited, but in one or more embodiments, polyvinyl chloride (PVC) is used. When the base material 21 is formed of PVC, it is easy to set the breaking elongation of the seal member 20 to, for example, 100% or more. When the breaking elongation of the seal member 20 is about 100% or more, for example, even when the seal member 20 is expanded so as to cover substantially entirely the region CR1, it is possible to suppress generation of cracking or the like in the seal member 20.

The adhesive material 22 is applied to the main surface on one side of the base material 21 in the thickness direction. In one or more embodiments, it is applied to substantially the entire surface of the main surface described above. By providing the adhesive material 22 on the base material 21, a predetermined adhesive force is imparted to the seal member 20. The material of the adhesive material 22 is not particularly limited, but when it is a rubber-based resin, the adhesive force tends to be easily imparted. Therefore, in one or more embodiments, a rubber-based resin is used as the adhesive material 22.

An initial adhesive force of such seal member 20 is not particularly limited as long as it is an adhesive force that can bond the seal member 20 to the first flange portion 12, but the seal member of one or more embodiments has an initial adhesive force of 1.5 N/10 mm or more and 10 N/mm or less. Note that the initial adhesive force refers to the adhesive force of the seal member 20 in a state where a temporal change or an environmental change hardly occurs in the seal member 20. Specifically, it refers to an adhesive force when the seal member 20 is first bonded to an object, and it refers to an adhesive force after a sample preparation period (for example, 24 hours) in accordance with JIS Z 0237.

Figure 6:
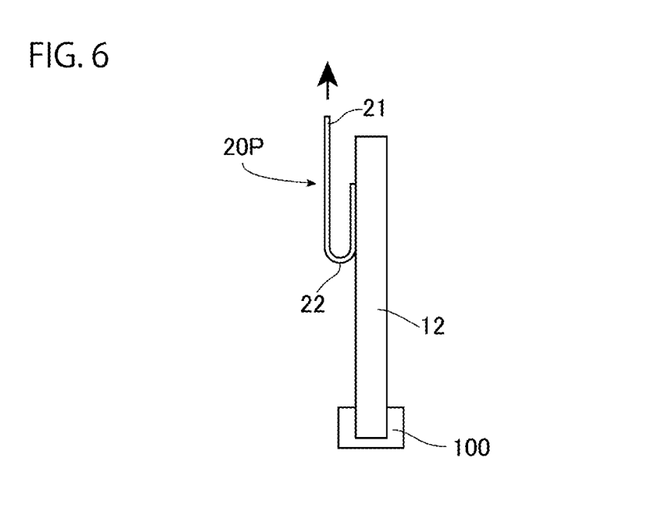
FIG. 6 is a view schematically illustrating a state of measuring adhesive force of a seal member.

In one or more embodiments, the adhesive force of the seal member 20 imparted by the adhesive material 22 is measured by an "adhesive force test by 180° peel on a test plate" specified in JIS Z 0237. Specifically, a sample 20P in which the adhesive material 22 described above is provided on the base material 21 described above is prepared. The sample 20P is adjusted to dimensions that can be used for this test. Then, as illustrated in FIG. 6, the first flange portion 12, which is a test plate, is fixed by a fixing chuck 100, and a portion extending over a predetermined length from the end portion on one side of the sample 20P is attached to the first flange portion 12. Then, the end portion on the other side of the sample 20P is held and the sample 20P is folded back to 180°, and the sample 20P is peeled off from the first flange portion 12 by pulling the end portion on the other side of the sample 20P. The force applied when the sample 20P is peeled off is defined as adhesive force (unit: N/10 mm).

As illustrated in FIG. 5, the bonding member 23 is a non-adhesive plate-shaped member, and has a substantially rectangular outer shape. The bonding member 23 is fixed to the base material 21 by being bonded to the adhesive material 22. In one or more embodiments, width W of the bonding member 23 is larger than the slit width SW (see FIG. 3) of the slit 16 described above and smaller than the width of the base material 21. For example, when the slit width SW of the slit 16 is about 8 mm as described above, the width W of the bonding member 23 may be larger than the slit width SW in a range of 1 mm or more and 3 mm or less. When the width W is larger than the width SW by 1 mm or more, even when the position where the bonding member 23 is bonded is displaced, the influence of the displacement can be less likely to occur. On the other hand, when the width W is larger than the width SW by 3 mm, the influence of the displacement described above is further less likely to occur. Further, when the width W is larger than the width SW by about 3 mm, it is possible to suppress generation of an unnecessary margin in the bonding member 23. Further, the bonding member 23 is arranged in a middle region in the width direction of the base material 21, and, when a direction perpendicular to the width direction and the thickness direction is a long side direction, extends over the entire length of the base material 21 in the long side direction.

As described above, the bonding member 23 has non-adhesiveness. The bonding member 23 is bonded to a part of the adhesive material 22, has a non-adhesive surface on the side opposite to the base material 21 side, and becomes a non-adhesive portion on one side (the side on which the adhesive material 22 is provided) in the thickness direction of the seal member 20. In this way, as illustrated in FIG. 5, on one side in the thickness direction of the seal member 20, a non-adhesive portion (bonding member 23) located in the middle and adhesive portions (adhesive material 22) located on both sides across the non-adhesive portion are formed. Here, the adhesive force of the bonding member 23, which is a non-adhesive portion, may be smaller than the adhesive force of the adhesive material 22, for example, smaller than 0.5 N/mm. Such an adhesive force tends to make it difficult for dust or the like to adhere.

Further, thickness H of the bonding member 23 is not particularly limited, but may be, for example, 30 μm or more and 150 μm or less, and in a case where the bonding member 23 is formed of polyethylene terephthalate (PET) as described below, may be 70 μm or more and 120 μm or less.

Further, in one or more embodiments, the bonding member 23 has a linear expansion coefficient smaller than the linear expansion coefficient of the base material 21. Therefore, when the base material 21 contracts, the contraction of the base material 21 can be suppressed by the bonding member 23 having a small linear expansion coefficient, and the deformation of the seal member 20 can be suppressed. Further, the bonding member 23 has a Young's modulus larger than the Young's modulus of the base material 21. Therefore, when the base material 21 is bent, the bending of the base material 21 can be suppressed by the bonding member 23 having a large Young's modulus, and the deformation of the seal member 20 can be suppressed. As described above, the bonding member 23 of one or more embodiments also functions as a deformation suppressing portion that suppresses deformation of the seal member 20. Note that, from the viewpoint of causing the bonding member 23 to function as a deformation suppressing portion and the like, the bonding member 23 may be formed from PET.

Next, a state of such a portion to which the seal member 20 is bonded will be described in detail.

Figure 7:
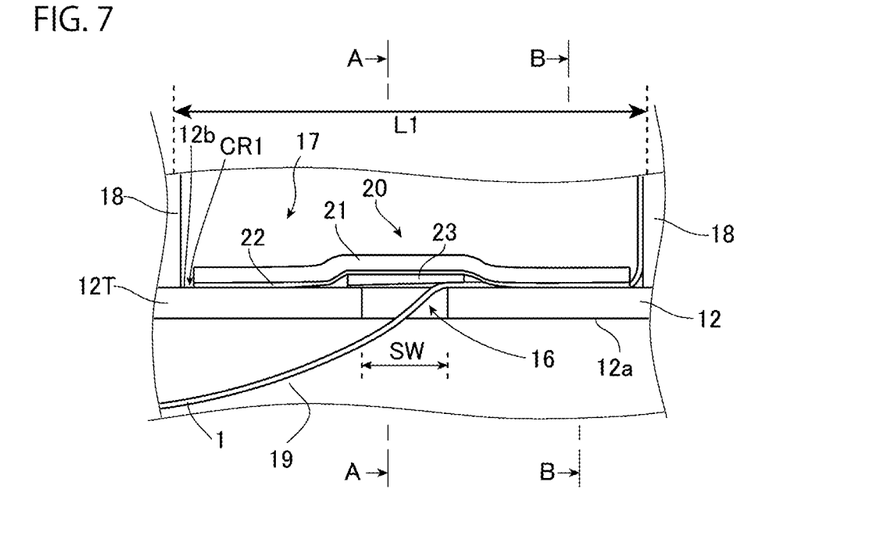
FIG. 7 is an enlarged view illustrating the vicinity of the seal member illustrated in FIG. 3.
Figure 8:
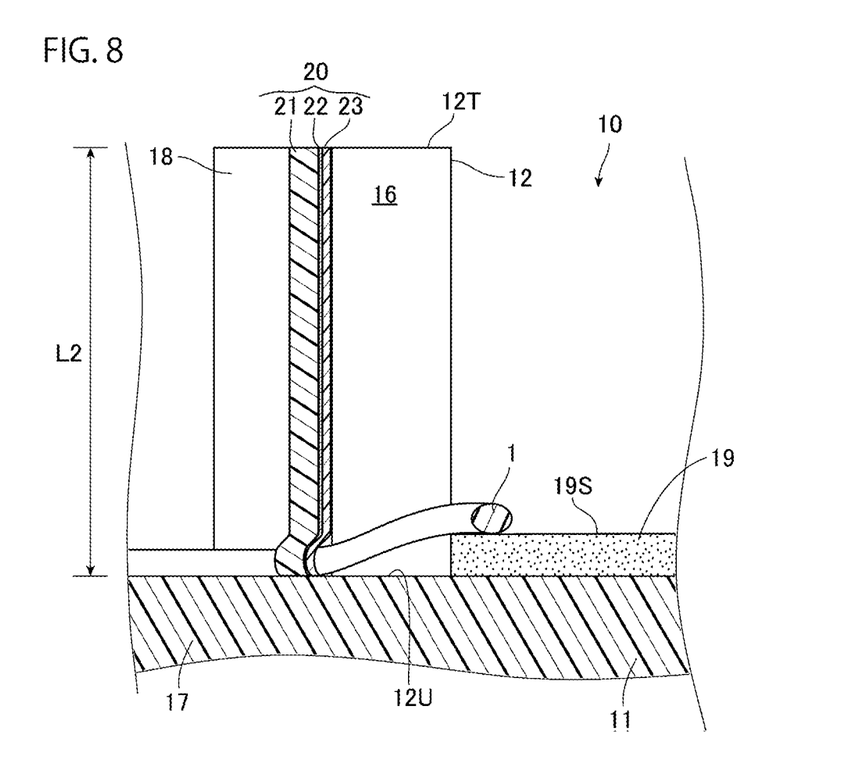
FIG. 8 is a view schematically illustrating a cross section taken along line A-A in FIG. 7.
Figure 9:
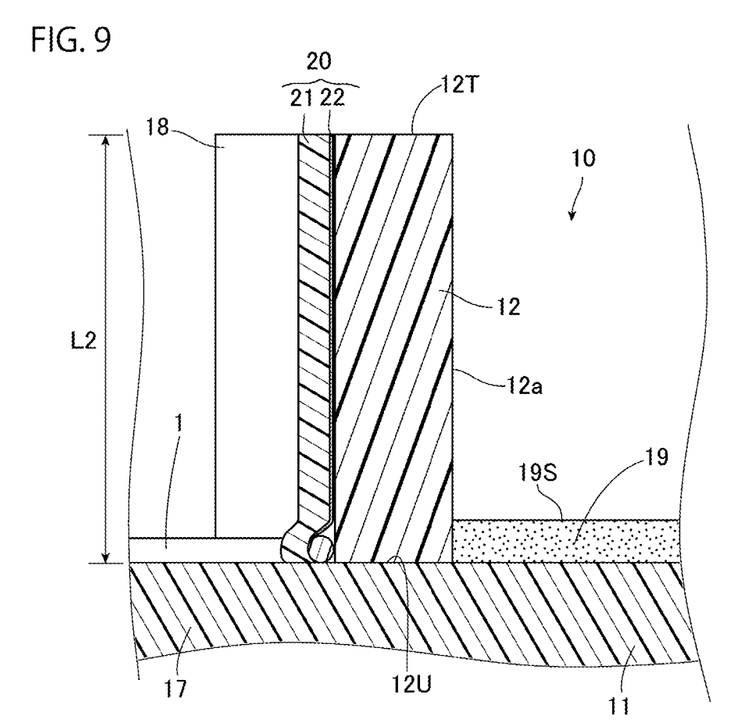
FIG. 9 is a view schematically illustrating a cross section taken along line B-B in FIG. 7.

FIG. 7 is an enlarged view illustrating the vicinity of the seal member 20 illustrated in FIG. 3, FIG. 8 is a view schematically illustrating a cross section taken along line A-A in FIG. 7, and FIG. 9 is a view schematically illustrating a cross section taken along line B-B in FIG. 7.

The seal member 20 is bonded to the region CR1 between the pair of ribs 18 on the second main surface 12b of the first flange portion 12 with the adhesive material 22 facing the first flange portion 12 side. Further, as described above, the slit 16 is formed in the region CR1. As illustrated in FIG. 7, the maximum width of the region CR1 is width L1 of a portion of the ribs 18 closest to the outer edge 12T of the first flange portion 12, and the direction of the width L1 substantially corresponds to the aforementioned width direction of the seal member 20. The width L1 may be, for example, approximately 5 cm. Further, the height of the region CR1 in the cross-sectional view of FIGS. 8 and 9 is entire width L2 of the first flange portion 12 in the radial direction, and the direction of the width L2 corresponds to the aforementioned long side direction of the seal member 20. Note that the width L2 may be, for example, approximately 5 cm.

As described above, the seal member 20 has a smaller dimension than the region CR1, but has elasticity. Therefore, as illustrated in FIGS. 7 to 9, the seal member 20 is stretched in the direction of the width L1 and the direction of the width L2 when bonded to the region CR1, and is bonded substantially entirely over the region CR1 by the adhesive force of the adhesive material 22. Thus, the slit 16 formed in the region CR1 is entirely covered with the seal member 20 bonded to the second main surface 12b. Specifically, as illustrated in FIG. 7, the entire length of the slit 16 in the direction of the width L1 is covered with the seal member 20. Further, as illustrated in FIG. 8, the entire length of the slit 16 in the direction of the width L2 is covered with the seal member 20. Further, as described above, the portions 18S on the slit 16 side of the respective outer edges of the pair of ribs 18 forming the region CR1 have a linear shape. Further, the pair of side surfaces 21S, which is a part of the outer edge of the seal member 20, has a shape corresponding to the portions 18S described above and has a linear shape. Therefore, as illustrated in FIG. 2, in a state where the seal member 20 is bonded to the region CR1, the side surfaces 21S of the seal member 20 and the portions 18S described above are substantially parallel to each other.

Incidentally, as described above, the non-adhesive bonding member 23 having the width W larger than the slit width SW of the slit 16 is provided in the middle region of the seal member 20 in the width direction described above. Further, the bonding member 23 is provided over the entire length of the seal member 20 in the long side direction described above. With such a configuration, in a state where the seal member 20 is attached to the region CR1, the slit 16 is entirely covered with the bonding member 23. When the slit 16 is viewed from the body portion 11 side, the seal member 20 is exposed toward the body portion 11 side as illustrated in FIGS. 7 and 8. In one or more embodiments, with the aforementioned configuration, the entire portion of the seal member 20 covering the slit 16 is the non-adhesive bonding member 23.

Further, as described above, the optical fiber 1 passes through the slit 16 and is introduced from the auxiliary body portion 17 side to the body portion 11 side. Therefore, as the seal member 20 is bonded to the second main surface 12b, a portion of the optical fiber 1 on the auxiliary body portion 17 side, in the vicinity of the slit 16, is fixed to the second main surface 12b via the adhesive material 22. At this time, the seal member 20 has elasticity as described above and is thus deformed according to the shape of the optical fiber 1 and substantially closely adheres to the optical fiber 1.

By fixing the optical fiber 1 to the second main surface 12b in this manner, the movement of a portion of the optical fiber 1 in the vicinity of the slit 16 can be suppressed for example, when the bobbin 10 around which the optical fiber 1 is wound rotates.

Note that the optical fiber 1 is introduced to the body portion 11 side through the slit 16 and fixed to the second main surface 12b, for example, in the state described below. That is, the optical fiber 1 introduced toward the second main surface 12b along the ribs 18 is sandwiched between the seal member 20 and the second main surface 12b and fixed in the vicinity of a base 12U of the first flange portion 12. In this way, the optical fiber 1 is guided to the slit 16 along an in-plane direction of the second main surface 12b, passes through the slit 16, and is introduced to the body portion 11 side. Here, as illustrated in FIG. 8, the body portion 11 is covered with the cushioning material 19. That is, the outer peripheral surface of the cushioning material 19 exists at a position displaced toward the outer edge 12T side of the first flange portion 12 relative to the outer peripheral surface of the body portion 11. Therefore, the optical fiber 1 is introduced to the body portion 11 side while being slightly inclined to the outer edge 12T side in the slit 16, and wound around an outer peripheral surface 19S of the cushioning material 19.

As described above, the bobbin for winding optical fiber 10 of one or more embodiments includes the body portion 11 around which the optical fiber 1 is wound, the first flange portion 12 extending from the body portion 11 in the radial direction, and the seal member 20 bonded to the axially outer side of the first flange portion 12. The first flange portion 12 is provided with the slit 16 penetrating the first flange portion 12. Further, a part of the seal member 20 entirely covers the slit 16, and the entire portion of the seal member 20 covering the slit 16 is the bonding member 23, which is a non-adhesive portion.

In the bobbin 10, since the slit 16 provided in the first flange portion 12 is entirely covered with the seal member 20, foreign matter such as dust can be suppressed from entering the body portion 11 side through the slit 16. Therefore, it is possible to suppress adhesion of the foreign matter to a portion of the optical fiber 1 wound around the body portion 11, in the vicinity of the slit 16.

Incidentally, as described above, the portion of the seal member 20 covering the slit 16 is exposed when viewed from the first main surface 12a side. Therefore, when the exposed portion is adhesive, there is a possibility that the foreign matter such as dust adheres to the exposed portion. However, in the bobbin 10, since the portion covering the slit 16, that is, the entire portion exposed when viewed from the first main surface 12a side is the non-adhesive bonding member 23, it is possible to suppress adhesion of the foreign matter to such an exposed portion.

As described above, with the bobbin for winding optical fiber 10, the optical fiber in the vicinity of the slit wound around the bobbin for winding optical fiber can be protected.

Further, as described above, the seal member 20 of one or more embodiments has an initial adhesive force of 1.5 N/10 mm or more and 10 N/10 mm or less. When the initial adhesive force of the seal member 20 is 1.5 N/10 mm or more, the seal member is hardly peeled off even when the seal member is rebonded to the flange portion a plurality of times. Further, when the initial adhesive force of the seal member is 10 N/10 mm or less, workability at the time of attaching and detaching the seal member can be improved.

Hereinafter, the reason why the initial adhesive force of the seal member 20 is set to 1.5 N/10 mm or more and 10 N/10 mm or less will be described.

The present inventor has conducted the following verification regarding the adhesive force of the seal member 20.

First, one sample 20P described above provided with the adhesive material 22 on the base material 21 was prepared, and the operation of attaching and peeling this to and from the first flange portion 12 was repeated 100 times, and then the residual adhesive force of the sample 20P was measured. As a result, it was confirmed that the adhesive force was about 50% of the initial adhesive force (2.5 N/10 mm). Normally, the rebonding operation is considered to be performed several times, and it is difficult to assume that the rebonding operation is performed 100 times. Therefore, even when rebonded under normal use conditions, it is considered that the adhesive force of 50% or more of the initial adhesive force remains in the sample 20P. Next, when the sample 20P with the adhesive force reduced to 20% (0.5 N/10 mm) of the initial adhesive force described above was bonded to the first flange portion 12 and the first flange portion 12 was rotated at a high speed at 5000 rotations/min, it was confirmed that the sample 20P did not peel off during rotation even with such adhesive force (0.5 N/10 mm).

On the basis of the verification result described above, a case where the initial adhesive force of the sample 20P is 1.5 N/10 mm is assumed. In this case, even when the adhesive force is reduced to, for example, 40% by rebonding the sample 20P 100 times or more, the residual adhesive force is 0.6 N/10 mm. This residual adhesive force is larger than the adhesive force (0.5 N/10 mm) at which it was confirmed that the sample 20P was not peeled off in the high-speed rotation test described above. That is, when the initial adhesive force of the sample 20P is 1.5 N/10 mm or more, it is considered that the adhesive force to the extent that the sample 20P is not peeled off remains under the high-speed rotation condition even when the sample 20P is rebonded a plurality of times under the normal use condition.

Next, a sample 20P having an initial adhesive force of 10 N/10 mm was attached to the first flange portion 12 and it was manually peeled off from the first flange portion 12, and it was effortlessly peeled off even manually. However, when a sample 20P having an initial adhesive force slightly larger than 10 N/10 mm was to be manually peeled off from the first flange portion 12, it was felt that it was difficult to peel off.

Incidentally, the seal member 20 has a configuration in which the bonding member 23 is bonded to the adhesive material 22 of the sample 20P as described above. However, as described above, the dimension of the bonding member 23 is merely a dimension larger than the slit width SW, for example, by about 2 mm, and a major part of the adhesive material 22 adheres to the first flange portion 12 when the seal member 20 is bonded at a right position as illustrated in FIGS. 7 and 9. That is, when the seal member 20 is bonded at the right position, the influence of the bonding member 23 on the adhesive force of the adhesive material 22 is small, and the value of the adhesive force of the sample 20P in the verification result described above and the value of the adhesive force of the seal member 20 are substantially the same value.

Therefore, when the initial adhesive force of the seal member 20 is 1.5 N/10 mm, since the seal member 20 has such an adhesive force that the seal member 20 is not peeled off from the first flange portion 12 under the high-speed rotation condition described above even when the seal member 20 is rebonded to the first flange portion 12 a plurality of times, the seal member 20 is hardly peeled off from the first flange portion 12. Further, when the initial adhesive force of the seal member 20 is 10 N/10 mm or less, the seal member 20 can be effortlessly peeled off manually and the workability can be improved.

Incidentally, when the position of the bonding member 23 is displaced from the right position when the seal member 20 is bonded to the first flange portion 12, the area of contact between the adhesive material 22 and the first flange portion 12 can be reduced, and the adhesive force of the seal member 20 to the first flange portion 12 can be reduced. However, when the seal member 20 is rebonded in order to bond the seal member 20 to the right position, the adhesive force of the seal member 20 can also be reduced. Therefore, the seal member 20 may be bonded at a right position.

In this regard, in one or more embodiments, as described above, since the position at which the seal member 20 is bonded is preset by the region CR1 surrounded by the pair of ribs 18 and the like, alignment is easy, and it is possible to effectively suppress displacement of the position at which the seal member 20 is bonded from the right position. Further, as described above, in one or more embodiments, the pair of side surfaces 21S, which is a part of the outer edge of the seal member 20, has a shape corresponding to the portions 18S on the respective slit 16 side of the pair of ribs 18 forming the region CR1 and has a linear shape, and therefore the seal member 20 can be bonded such that the side surfaces 21S of the seal member 20 are along the portions 18S on the slit 16 side of the ribs 18. Therefore, the alignment of the seal member 20 is further easy, and it is possible to more effectively suppress the displacement of the position at which the seal member is bonded from the right position.

Further, in the bobbin 10, as described above, the width of the bonding member 23 is larger than the slit width SW of the slit 16 by, for example, about 2 mm. With such a configuration, for example, the slit 16 can be easily covered with the bonding member 23 as compared with the case where the width of the bonding member 23 is the same as the slit width SW.

Further, in the embodiments described above, since the linear expansion coefficient of the bonding member 23 is smaller than the linear expansion coefficient of the base material 21, as described above, the contraction of the base material 21 is suppressed by the bonding member 23 and the deformation of the seal member can be suppressed. Further, since the Young's modulus of the bonding member 23 is larger than the Young's modulus of the base material 21, the bending of the base material 21 can be suppressed by the bonding member 23 and the deformation of the seal member can be suppressed. As described above, since the bonding member 23 functions as the deformation suppressing portion that suppresses the deformation of the seal member 20, it is possible to suppress generation of wrinkles in the seal member 20 and generation of curling at the end portion of the seal member 20 due to a temperature change.

Further, by setting the thickness of the bonding member 23 to 70 µm or more as described above, the strength of the bonding member 23 can be enhanced as compared with the case where the thickness is smaller than 70 µm. Therefore, the deformation of the base material 21 can be suppressed by setting the thickness of the bonding member 23 to 70 µm or more. On the other hand, when the thickness of the bonding member 23 is a thinness of 120 µm or less, a step between the base material 21 and the bonding member 23 can be reduced as compared with the case where the thickness of the bonding member 23 is larger than 120 µm. When the step between the base material 21 and the bonding member 23 is small as described above, it is possible to suppress a decrease in the bonding area between the adhesive material 22 and the first flange portion 12 due to the step, and it is possible to have favorable adhesiveness between the seal member 20 and the first flange portion 12.

Although the present invention has been described above by taking the aforementioned embodiments as examples, the present invention is not limited thereto.

For example, in the embodiments described above, an example in which the slit 16 is entirely covered with the seal member 20 has been described, but a part of the slit 16 may be covered with the seal member 20. Hereinafter, this point will be described with reference mainly to FIGS. 10 and 11. Note that the same or equivalent components as those of the embodiments described above are designated by the same reference numerals and duplicated description will be omitted unless otherwise specified.

Figure 10:
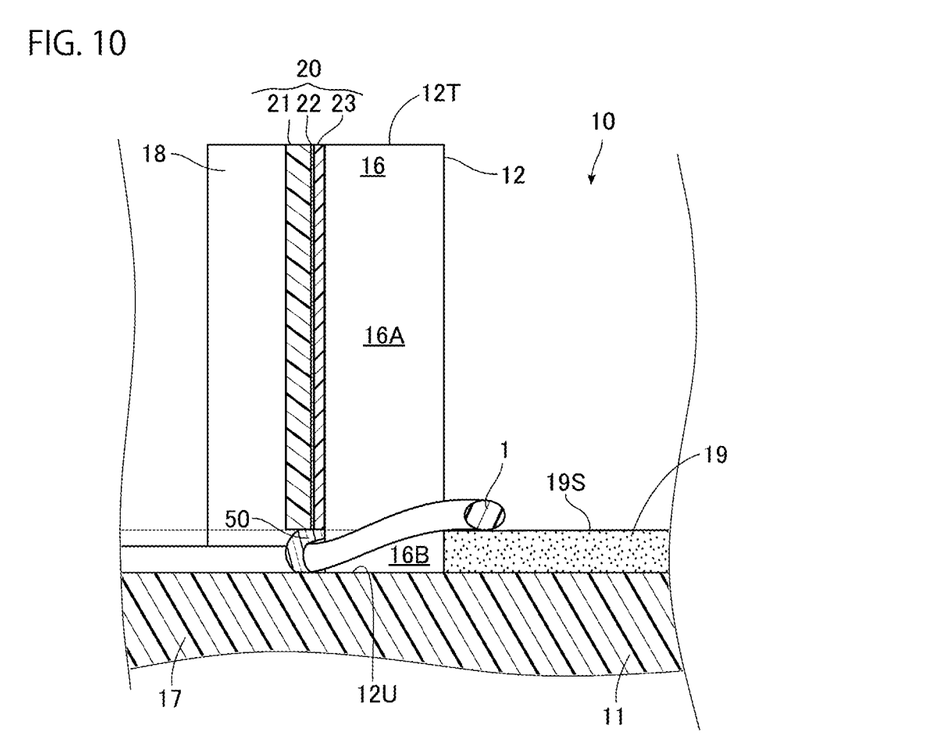
FIG. 10 is a view illustrating a modification of the embodiments from the same viewpoint as FIG. 8.
Figure 11:
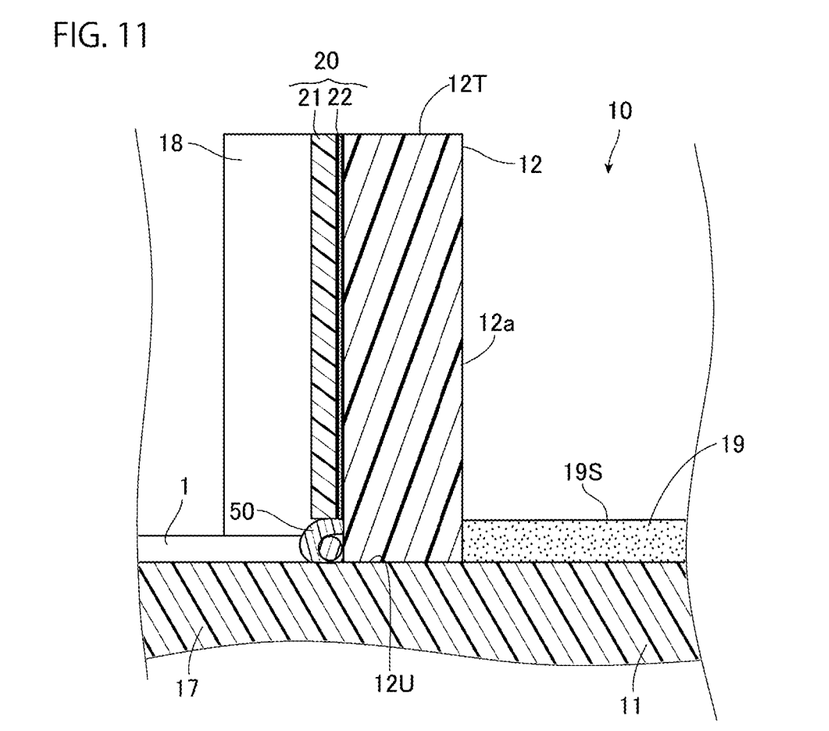
FIG. 11 is a view illustrating a modification of the embodiments from the same viewpoint as FIG. 9.

FIG. 10 is a view illustrating a modification in which a part of the slit 16 is covered with the seal member 20 from the same viewpoint as FIG. 8, and FIG. 11 is a view illustrating the modification described above from the same viewpoint as FIG. 9. As illustrated in FIGS. 10 and 11, in this modification, the seal member 20 does not extend to the base 12U of the first flange portion 12, but extends to the position of the outer peripheral surface 19S of the cushioning material 19. That is, the slit 16 includes a first region 16A located on the outer edge 12T side of the first flange portion 12 with reference to the position of the outer peripheral surface 19S of the cushioning material 19, and a second region 16B located on the base 12U side of the first flange portion 12 with reference to the position of the outer peripheral surface 19S. Then, the first region 16A is covered with the seal member 20, and the second region 16B is not covered with the seal member 20.

As in the embodiments described above, the bonding member 23 has a width larger than the slit width SW and extends over the entire length of the base material 21 in the direction perpendicular to the width direction described above and the thickness direction described above. Therefore, the first region 16A is entirely covered with the non-adhesive bonding member 23.

Further, a fixing seal 50 is bonded to a portion of the first flange portion 12 between the base 12U and an end portion of the seal member 20 on the base 12U side. The fixing seal 50 covers the second region 16B of the slit 16, and fixes the optical fiber 1 extending through the slit 16 toward the auxiliary body portion 17 side to the second main surface 12b of the first flange portion 12.

Note that it is not essential to provide the fixing seal 50. However, in the present modification, the seal member 20 does not reach the base 12U of the first flange portion 12. Therefore, when the fixing seal 50 is not provided, the optical fiber 1 can be introduced to the body portion 11 side without being fixed to the first flange portion 12.

The optical fiber 1 on the body portion 11 side is wound on the outer peripheral surface 19S of the cushioning material 19, and is positioned on the outer edge 12T side with respect to the optical fiber wound around the auxiliary body portion 17. That is, the optical fiber 1 on the body portion 11 side does not face the fixing seal 50, but faces the seal member 20 located on the outer edge 12T side with respect to the outer peripheral surface of the auxiliary body portion 17 across the first region 16A. Here, as described above, the first region 16A is entirely covered with the bonding member 23. Therefore, the optical fiber 1 on the body portion 11 side faces the bonding member 23 across the first region 16A.

According to such a modification, even when the seal member 20 does not reach the base 12U of the first flange portion 12, the first region 16A facing the optical fiber 1 on the body portion 11 side is entirely covered with the seal member 20, so that it is possible to suppress entry of the foreign matter through the slit 16 to the body portion 11 side and to protect a portion of the optical fiber 1 in the vicinity of the slit 16. Further, in the present modification, since the second region 16B not covered with the seal member 20 is covered with the fixing seal 50, it is possible to suppress entry of the foreign matter through the slit 16 to the body portion 11 side also by the fixing seal 50.

Further, in the present modification, the first region 16A is entirely covered with the bonding member 23. Therefore, adhesion of the foreign matter to a portion of the seal member 20 facing the optical fiber 1 on the body portion 11 side can be suppressed. Therefore, it is possible to suppress the foreign matter adhered to the seal member from touching a portion of the optical fiber in the vicinity of the slit and affecting the quality of the optical fiber.

Note that, in the modification described above, the example in which the first region 16A of the slit 16 is entirely covered with the seal member 20 has been described. However, when at least a part of the slit 16 is covered with the seal member 20, it is possible to suppress the foreign matter from entering the body portion 11 side to some extent. Further, when at least a part of the portion of the seal member 20 covering the slit 16 is the bonding member 23, it is possible to suppress the foreign matter adhered to the seal member from touching a portion of the optical fiber in the vicinity of the slit and affecting the quality of the optical fiber to some extent.

Further, in the embodiments described above, the example in which the bonding member 23 functions as the deformation suppressing portion has been described, but as long as the bonding member 23 functions as a non-adhesive portion having non-adhesiveness, the bonding member 23 may not necessarily function as the deformation suppressing portion.

Figure 12:
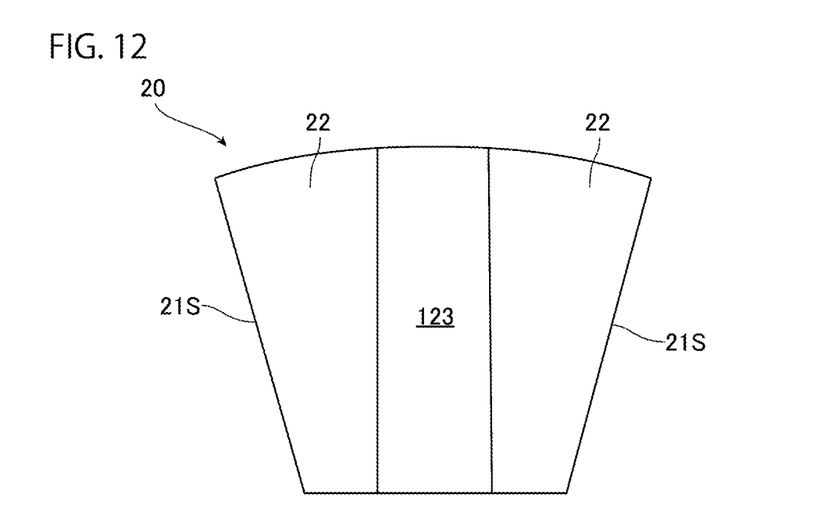
FIG. 12 is a view illustrating a modification of the seal member from the same viewpoint as FIG. 5.

Further, in the embodiments described above, the example in which the non-adhesive portion is the bonding member 23 has been described, but the non-adhesive portion may be formed by other means. For example, as illustrated in FIG. 12, the application range of the adhesive material may be adjusted so that the adhesive material 22 is not applied to a part of the non-adhesive base material 21 and the region of the base material 21 to which the adhesive material 22 is not applied is a non-adhesive portion 123. However, when the non-adhesive portion is formed of the bonding member 23, the non-adhesive portion can be formed only by bonding the bonding member to the adhesive material already applied to the base material. Therefore, the seal member having the non-adhesive portion can be easily formed as compared with the case where the region of the base material 21 to which the adhesive material 22 is not applied is the non-adhesive portion.

Further, at least a portion of the seal member 20 covering the slit 16 may be ultraviolet non-transmissive. With such a configuration, it is possible to suppress ultraviolet rays from entering the body portion 11 side through the slit 16, and it is possible to suppress a portion of the optical fiber 1 wound around the body portion 11, in the vicinity of the slit, from being affected by the ultraviolet rays.

Further, in the embodiments described above, the example in which the cushioning material 19 is provided on the body portion 11 has been described, but the cushioning material 19 may not necessarily be provided on the body portion 11. However, in a case where the cushioning material 19 is provided on the body portion 11, when the optical fiber 1 is wound in multiple layers around the body portion 11, it is possible to suppress pressure from being applied to the optical fiber 1 located in lower layers from the optical fiber 1 located in upper layers.

Further, in the embodiments described above, the example in which the slit 16 extends over the entire width of the first flange portion 12 in the radial direction has been described, but this is not essential. That is, when the bobbin 10 is viewed from the second main surface 12b side, the slit 16 may not reach the body portion 11.

Further, in the embodiments described above, the example in which the portions 18S on the slit 16 side of the outer edges of the ribs 18 forming the region CR1 and the side surfaces 21S, which are a part of the outer edge of the seal member 20, have a linear shape has been described. However, when a part of the outer edge of the seal member 20 has a shape corresponding to the outer edges on the slit 16 side of the ribs 18 forming the region CR1, the seal member 20 can be bonded such that a part of the outer edge of the seal member 20 is along the outer edges on the slit 16 side of the ribs 18. Therefore, alignment of the seal member 20 can be easy. As such an example, there is a case where the outer edges on the slit 16 side of the pair of ribs 18 forming the region CR1 and a part of the outer edge of the seal member 20 have a curved shape having the same curvature.

Further, in the embodiments described above, the example in which a part of the outer edge of the seal member 20 has a shape corresponding to the portions on the slit 16 side of the respective outer edges of the pair of ribs 18 forming the region CR1 has been described. However, when a part of the outer edge of the seal member 20 has a shape corresponding to the portion on the slit 16 side of the outer edge of one of the pair of ribs 18 forming the region CR1, the seal member 20 can be bonded such that the part of the outer edge of the seal member 20 is along the portion on the slit 16 side of the rib 18. Therefore, alignment of the seal member 20 can be easy.

Further, in the embodiments described above, the example in which a part of the outer edge of the seal member 20 has a shape corresponding to the outer edges on the slit 16 side of the ribs 18 adjacent to the slit 16 has been described, but a part of the outer edge of the seal member 20 may not have a shape corresponding to the outer edges on the slit 16 side of the ribs 18 adjacent to the slit 16.

Further, in the embodiments described above, the example in which the ribs as described above are provided on the first flange portion 12 and the second flange portion 13 has been described. However, it is not essential that the ribs extend to the body portion, and the number of ribs may be one or the rib may not be provided on the flange portion.

Further, in the embodiments described above, the example in which the void penetrating the first flange portion 12 from the first main surface 12a toward the second main surface 12b is the slit 16 has been described, but it is not limited thereto. The void may be, for example, a through-hole penetrating the first flange portion 12 from the first main surface 12a toward the second main surface 12b, and the shape of the through-hole may be a circle, a rectangle, or other shapes. However, when the void is a through-hole, it is necessary to insert the optical fiber into the through-hole when the optical fiber 1 is introduced from the second main surface 12b side to the body portion 11 side, and the work tends to take time and effort. On the other hand, when the void is a slit, it is not necessary to insert the optical fiber into the through-hole, and the optical fiber can be easily introduced from the second main surface 12b side to the body portion 11 side. This contributes to, for example, automation of a process of winding the optical fiber around the bobbin.

According to the present invention, there is provided a bobbin for winding optical fiber capable of protecting an optical fiber in the vicinity of a void such as a slit penetrating a flange portion, and the bobbin for winding optical fiber can be used, for example, in the field of communication.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A bobbin for winding optical fiber comprising:
    a body around which an optical fiber is wound;
    a flange that extends in a radial direction from the body; and
    a seal that is bonded to a side surface of the flange facing an axial direction of the bobbin, wherein
    the flange has a void that extends through an entire thickness of the flange,
    a part of the seal extends across and covers at least a part of the void, and
    at least a part of a portion of the seal is non-adhesive, wherein the portion covers the void.

2. The bobbin according to claim 1, wherein the void is entirely covered with the seal.

3. The bobbin according to claim 1, wherein an entirety of the portion of the seal is non-adhesive.

4. The bobbin according to claim 1, wherein the portion of the seal is ultraviolet non-transmissive.

5. The bobbin according to claim 1, wherein the seal has an initial adhesive force of 1.5 N/10 mm or more and 10 N/10 mm or less.

6. The bobbin according to claim 1, wherein the void is a slit extending from an outer edge of the flange toward the body.

7. The bobbin according to claim 6, wherein a width of the part of the portion of the seal is larger than a width of the slit.

8. The bobbin according to claim 7, wherein the width of the part of the portion is larger than the width of the slit by 1 mm or more and 3 mm or less.

9. The bobbin according to claim 1, wherein elongation at break of the seal is greater than or equal to 100%.

10. The bobbin according to claim 1, wherein
the flange comprises a rib that protrudes in the axial direction of the bobbin from the side surface of the flange and extends from an outer edge of the flange toward the body, and
a part of an edge of the seal has a shape corresponding to a shape of an edge of the rib facing toward the void.

11. The bobbin according to claim 1, wherein
the seal comprises:
- a base material having a sheet shape;
- an adhesive material on a surface of the base material facing the flange; and
- a bonding member that is bonded to the adhesive material and has a non-adhesive surface away from the base material.

12. The bobbin according to claim 11, wherein a linear expansion coefficient of the bonding member is smaller than a linear expansion coefficient of the base material.

13. The bobbin according to claim 12, wherein the adhesive material comprises a portion separated from the flange between a portion bonded to the flange and a portion to which the bonding member is bonded.

14. The bobbin according to claim 11, wherein a Young's modulus of the bonding member is larger than a Young's modulus of the base material.

15. The bobbin according to claim 11, wherein a thickness of the bonding member is 70 μm or more and 120 μm or less.

16. The bobbin according to claim 1, further comprising:
- an auxiliary body portion extending in the axial direction of the bobbin on a side of the side surface of the flange to which the seal is bonded; and
- an auxiliary flange extending outward in the radial direction from a side surface of the auxiliary body portion away from the flange.

17. The bobbin according to claim 1, wherein,
the optical fiber is wound around the body,
one end of the optical fiber is led out through the void of the flange from a side farther from the body to a side closer to the body, and
a part of the optical fiber is fixed to the flange by the seal.

* * * * *